(12) United States Patent
Mori et al.

(10) Patent No.: US 6,508,951 B1
(45) Date of Patent: Jan. 21, 2003

(54) LOW P TYPE COOLANT COMPOSITION

(75) Inventors: Yasuaki Mori, Gifu (JP); Michihiro Hori, Saitama (JP); Mitsuru Osawa, Saitama (JP); Takashi Nagashima, Saitama (JP)

(73) Assignees: CCI Kabushiki Kaisha, Gifu (JP); Honda Giken Kogyo, Tokyo (JP)

( * ) Notice: Subject to any disclaimer, the term of this patent is extended or adjusted under 35 U.S.C. 154(b) by 220 days.

(21) Appl. No.: 09/654,375

(22) Filed: Sep. 1, 2000

(30) Foreign Application Priority Data

Sep. 2, 1999 (JP) ............................. 11-248210

(51) Int. Cl.$^7$ ............................. C09K 3/18; C23F 11/00
(52) U.S. Cl. ............................. 252/73; 252/71; 252/74; 252/75; 252/76; 252/77; 252/78.5; 252/389.2; 252/387
(58) Field of Search ............................. 252/71, 75, 74, 252/76, 73, 78.5, 77, 389.2, 387

(56) References Cited

U.S. PATENT DOCUMENTS

| | | | |
|---|---|---|---|
| 4,452,715 A | * | 6/1984 | Harozawa ............... 252/75 |
| 4,810,404 A | * | 3/1989 | Gousetis et al. ............... 252/75 |
| 5,387,360 A | | 2/1995 | Uekusa et al. |
| 5,718,836 A | | 2/1998 | Nakatani et al. |
| 5,811,025 A | | 9/1998 | Kawai et al. |
| 5,851,419 A | | 12/1998 | Miyake et al. |

FOREIGN PATENT DOCUMENTS

| | | |
|---|---|---|
| EP | 0 118 395 A | 9/1984 |
| EP | 0 242 900 A | 10/1987 |
| JP | 02/292386 A | 2/1991 |

* cited by examiner

Primary Examiner—Yogendra N. Gupta
Assistant Examiner—D G Hamlin
(74) Attorney, Agent, or Firm—Jeffrey D. Myers

(57) ABSTRACT

A glycol-based coolant composition which provides an excellent metal corrosion inhibition despite its low phosphorus content is disclosed. The glycol-based coolant composition contains: (A) 0.1–5.0% by weight of at least one ingredient selected from group A' consisting of C6–C12 aliphatic dibasic acids and their alkali metal salts; (B) 0.1–10% by weight of at least one ingredient selected from group B' consisting of alkyl benzoic acids and their alkali metal salts; (C) 0.001–0.1% by weight of at least one ingredient selected from group C' consisting of strontium compounds and their alkali metal salts; and (D) 0.1–0.3% by weight of at least one ingredient selected from group D' consisting of phosphoric acids and their alkali metal salts.

4 Claims, No Drawings

LOW P TYPE COOLANT COMPOSITION

BACKGROUND OF THE INVENTION

1. Field of the Invention

This invention generally relates to a coolant composition for preparation of coolants used chiefly in heat-exchange systems for internal-combustion engines. More particularly, this invention relates to a coolant composition whose phosphorus content is "low".

2. Related Art

Generally glycol-based coolant compositions are blended with diluent water to prepare coolants to be used in heat-exchange systems of internal-combustion engines. Conventional glycol-based coolant compositions selectively contain metal corrosion inhibiting agents or additives such as phosphates, amines, silicates, borates and nitrites in order to inhibit corrosion of metallic parts in heat-exchange systems such as aluminum, aluminum alloy, cast iron, steel, brass, solder and copper portions, which are more or less corroded without such corrosion inhibiting additives by contacting diluent water (and/or air) existing in coolants along with the coolant compositions.

Phosphates are generally regarded as an excellent corrosion inhibitor against iron and aluminum. However, phosphates are apt to cause precipitation in coolants by chemically reacting with hard water components generally contained in diluent water, which will result in deterioration of corrosion inhibiting power of the coolants.

Accordingly, it is an object of the present invention to provide a coolant composition that is capable of providing benefits from its phosphate content without presenting defects therefrom.

Other objects of the present invention will become apparent from the description that follows hereunder.

SUMMARY OF THE INVENTION

A glycol-based coolant composition according to the present invention basically contains the following ingredients in the content ranges respectively specified in groups (A)–(D):

(A) 0.1–5.0% by weight of at least one ingredient selected from group A' consisting of C6–C12 aliphatic dibasic acids and alkali metal salts thereof;

(B) 0.1–10% by weight of at least one ingredient selected from group B' consisting of alkyl benzoic acids and alkali metal salts thereof;

(C) 0.001–0.1% by weight of at least one ingredient selected from group C' consisting of strontium compounds and alkali metal salts thereof; and (D) 0.1–0.3% by weight of at least one ingredient selected from group D' consisting of phosphoric acids and alkali metal salts thereof.

A glycol-based coolant composition of the present invention may exclude therefrom such conventional additives as silicates, amine salts, borates, nitrites and molybdates so as to suppress undesired phenomena in coolants where the coolant composition is blended, without causing negative effects from not including those conventional additives.

A glycol-based coolant composition of the present invention may contain 0.01–1.0% by weight of a triazole or triazoles and/or 0.01–1.0% by weight of thiazole or thiazoles to provide additional corrosion inhibition against metals, in particular copper.

DETAILED DESCRIPTION OF PREFERRED EMBODIMENTS

The present invention is further described hereunder in greater detail. A coolant composition according to the present invention is glycol based as are conventional ones. Glycols that can be advantageously utilized in the present invention are selected from ethylene glycol, propylene glycol, 1,3 butylene glycol, hexylene glycol, diethylene glycol and glycerol, among which ethylene glycol and propylene glycol are more advantageously utilized. However, this invention does not restrict types of glycols used. Other glycols may equally be used.

A glycol-based coolant composition of the present invention further comprises:

(A) at least one ingredient selected from group A' consisting of C6–C12 aliphatic dibasic acids and alkali metal salts thereof;

(B) at least one ingredient selected from group B' consisting of alkyl benzoic acids and alkali metal salts thereof;

(C) at least one ingredient selected from group C' consisting of strontium compounds and alkali metal salts thereof; and (D) at least one ingredient selected from group D' consisting of phosphoric acids and alkali metal salts thereof.

Such C6–C12 aliphatic dibasic acids in group A' may be suberic acid, azelaic acid, sebacic acid, undecanoic diacid or dodecanoic diacid, among which sebacic acid (SA) is preferably utilized. These aliphatic dibasic acids may also be utilized in their alkali metal salt forms such as their sodium and potassium salts.

An ingredient or ingredients in group A' effectively inhibit corrosion of metals, together with ingredients of group B' and group D', particularly iron and aluminum portions of heat-exchange systems of internal-combustion engines.

At least one ingredient selected from group A' is blended in a coolant composition of the present invention in an amount 0.1–5.0% by weight of the whole coolant composition. Outside of this range will result either in insufficient metal corrosion inhibition or mere waste of valuable materials.

Alkyl benzoic acids of group B' may be ones having a chemical structure "R—C6H4—COOH" (wherein R is a C1–C5 alkyl radical) such as p-tert butyl benzoic acid and p-methyl benzoic acid. Such alkyl benzoic acids may be equally used in their alkali metal salt forms such as their sodium and potassium salts.

At least one ingredient selected from group B' is additionally blended in an amount 0.1–10% by weight of the whole coolant composition. Outside of this range will result either in insufficient metal corrosion inhibition or mere waste of valuable materials.

An ingredient or ingredients in group B' effectively inhibit, together with ingredients of group A' and group D', metal corrosion, particularly iron and aluminum portions in heat-exchange systems of internal-combustion engines.

Strontium compounds of group C' may be selected from strontium oxide, strontium hydroxide, strontium chloride, strontium fluoride, strontium iodide, strontium sulfate, strontium nitrate, strontium titanate, strontium borate, strontium tungstate, strontium phosphate, strontium dihydric phosphate, strontium formate, strontium acetate, strontium propionate, strontium butyrate, strontium valerate, strontium laurate, strontium stearate, strontium oleate, strontium glutamate, strontium lactate, strontium succinate, strontium malate, strontium tartrate, strontium maleate, strontium citrate, strontium oxalate, strontium malonate, strontium sebacate, strontium benzoate, strontium phthalate, strontium salicylate and strontium mandelate.

At least one ingredient of group C' is additionally used in an amount 0.001–0.1% by weight of the whole coolant composition. Outside of this range will result either in insufficient aluminum corrosion inhibition or mere waste of valuable materials.

An ingredient or ingredients in group C' effectively inhibit, in cooperation with an ingredient or ingredients of group D', "heating surface corrosion" of aluminum portions of heat-exchange systems of internal-combustion engines.

Phosphoric acid or acids or alkali metal salts thereof of group D' effectively prevent corrosion of iron and aluminum portions in cooperation with ingredients in groups A' and B'. In addition, an ingredient or ingredients of group D' in use effectively prevent blackening of aluminum portions in heat-exchange systems. In further addition, an ingredient or ingredients of group D' work in cooperation with an ingredient or ingredients of group C' to inhibit heating surface corrosion of aluminum portions.

At least one ingredient of group D' is contained in a coolant composition of the present invention in an amount 0.1–0.3% by weight of the whole coolant composition. Outside of this range will result either in insufficiency or more waste of valuable materials as well as deterioration of corrosion inhibition power causable by chemical reaction with hard water components in a coolant where the coolant composition of the present invention is blended.

A coolant composition of the present invention may exclude silicates, amine salts, borates, nitrites and molybdates, which are popularly contained in conventional coolant compositions.

Expected merits from not containing such conventional ingredients are as follows. Amine salts and nitrites likely react chemically with each other when they coexist in coolants and produce nitrosoamine which is a carcinogenic substance. Silicates are relatively unstable in coolants and tend to gel when there occur changes in temperature and/or pH value in the coolants or where other salts coexist in the coolants, deteriorating their expected contribution. Borates tend to corrode aluminum or aluminum alloys, while nitrites likely degrade fast, quickly losing their corrosion inhibition power. Molybdates are likely to oxidize and degrade coolants.

A coolant composition of the present invention optionally contains 0.05–1.0% by weight of a triazole or triazoles. Such triazole may preferably be tolyltriazole or benzotriazole. Triazoles can effectively inhibit corrosion of metallic portions, especially copper portions, of heat-exchange systems of internal-combustion engines.

A coolant composition of the present invention optionally contains a thiazole or thiazoles in an amount of 0.01 to 1.0% by weight. Such thiazole may preferably be 2-mercaptobenzothiazole. A thiazole or thiazoles can effectively prevent corrosion of metallic portions, especially copper portions.

Coolant compositions of the present invention may further selectively contain other conventional additives such as an antifoaming agent and coloring agent. Coolant compositions of the present invention may further selectively contain still other conventional metal corrosion inhibiting additives such as a tungstate, sulfate, nitrate and benzoate.

Comparison Testing:

The present invention is further described by way of comparison testing conducted by the inventors using an embodiment according to the present invention, comparison 1, comparison 2 and comparison 3.

Comparison 1 is similar to the embodiment except that it does not contain ingredients of groups A' and B', instead containing an amount of benzoic acid. Comparison 2 contains ingredients selected from groups A' and B', however, it does not contain ingredients of groups C' and D'. Comparison 3 is similar to the embodiment except that it does not contain an ingredient of group C'. The respective ingredients of the embodiment, comparison 1, comparison 2 and comparison 3 are given below in Table 1.

TABLE 1

| | (wt. %) | | | |
|---|---|---|---|---|
| Ingredient | Emb. | Comp. 1 | Comp. 2 | Comp. 3 |
| Phosphoric acid | 0.2 | 0.2 | — | 0.2 |
| Sebacic acid | 2.0 | — | 2.0 | 2.0 |
| p-tert butyl-benzoic acid | 2.0 | — | 2.0 | 2.0 |
| Benzoic acid | — | 4.0 | — | — |
| Strontium nitrate | 0.01 | 0.01 | — | — |
| Tolyltriazole | 0.3 | 0.3 | 0.3 | 0.3 |
| 2-mercaptobenzothiazole soda | 0.1 | 0.1 | 0.1 | 0.1 |
| Potassium hydrate | 1.93 | 2.01 | 1.99 | 1.93 |
| Ethylene glycol | remainder | remainder | remainder | remainder |
| pH value (30%) | 7.8 | 7.8 | 7.8 | 7.8 |

The test samples of the embodiment, comparison 1 and comparison 2 were tested against metal corrosion in hard water. Those test samples were respectively blended with hard water to separately prepare test coolants with hardness 800 ppm by adding appropriate amounts of potassium chloride into ion exchange water. Blackening phenomenon of aluminum was concurrently observed.

The test metal pieces used in the comparison testing were pieces of cast aluminum, cast iron, steel, brass, solder and copper. The tests were carried out in accordance with "JIS K 2234 7.8", standard Japanese metal corrosion test conditions. The test results are provided in Table 2.

TABLE 2

| | Change in Weight mg/cm2 | | | |
|---|---|---|---|---|
| Metal | Emb. | Comp. 1 | Comp. 2 | Comp. 3 |
| Cast Aluminum | −0.09 | −0.43 | −0.12 | — |
| Cast iron | −0.06 | 0.00 | +0.01 | — |
| Steel | −0.03 | −0.02 | 0.00 | — |
| Brass | −0.05 | −0.07 | −0.09 | — |
| Solder | −0.07 | −0.04 | −0.06 | — |
| Copper | +0.02 | −0.00 | −0.05 | — |
| Post-Test Appearance | | | | |
| Corrosion | Normal | partial corrosion on cast Al | Normal | — |
| Discoloration | No change | No change | Blackening on cast Al | — |

The test samples of the embodiment and comparisons 1 and 2 were also tested against "circulation metal corrosion" according to JIS K 2234 7.8. Aluminum blackening was also observed. The test results are given in Table 3.

TABLE 3

| | Change in weight mg/cm2 | | | |
|---|---|---|---|---|
| Metal | Emb. | Comp. 1 | Comp. 2 | Comp. 3 |
| Cast Aluminum | +0.02 | +0.03 | −0.33 | — |
| Cast iron | +0.01 | 0.00 | −0.05 | — |
| Steel | 0.00 | 0.00 | −0.02 | — |
| Brass | −0.02 | −0.03 | −0.03 | — |
| Solder | −0.03 | −0.05 | −0.05 | — |
| Copper | +0.01 | −0.02 | −0.01 | — |
| Post-Test Appearance | | | | |
| Corrosion | Normal | Normal | Roughing on cast Al | — |
| Discoloration | No change | No change | Blackening on cast Al | — |

The test samples of the embodiment and comparisons 1–3 were used for "aluminum heating surface corrosion testing" according to "JIS K 2234 10", another standard Japanese test conditions. Aluminum blackening was also observed. The test results are given in Table 4.

TABLE 4

| | Change in weight mg/cm2 | | | |
|---|---|---|---|---|
| Metal | Emb. | Comp. 1 | Comp. 2 | Comp. 3 |
| Cast aluminum | −0.1 | −0.1 | −0.1 | −0.3 |
| Post-Test Appearance | | | | |
| Corrosion | Normal | Normal | Normal | Normal |
| Discoloration | No change | No change | Blackening | Blackening |

Tables 2–4 clearly show: (i) that comparison 1 containing a benzoic acid instead of ingredients of groups A' and B' deteriorated in corrosion inhibiting power in hard water, causing considerable aluminum corrosion; (ii) that comparison 2 that does not contain ingredients of groups C' and D' causes aluminum blackening; and (iii) that comparison 3 that does not contain an ingredient of group C' causes considerable aluminum heating surface corrosion, while (iv) that the embodiment retains an excellent metal corrosion inhibiting property in hard water; (v) that it does not cause blackening of aluminum; and (vi) that it effectively inhibits aluminum heating surface corrosion.

Conclusion:

Coolant compositions according to the present invention contain as little as about one fifth of normal or conventional amount of an ingredient or ingredients of group D' (phosphoric acids and alkali metal salts thereof) or only 0.1–0.3% by weight, but they provide excellent iron and aluminum corrosion inhibition.

What little ingredient or ingredients of group D' that the coolant compositions of the present invention contain will firmly adhere in use to the surfaces of metallic portions of the heat-exchange systems of internal-combustion engines. Thus, when accidentally discharged into river waters, exhaust coolants containing a coolant composition of the present invention will not cause eutrophication in river waters.

Further, since coolant compositions of the present invention contain only a small amount of an ingredient or ingredients of group D', they hardly deteriorate when blended with hard water.

Further yet, what little content of an ingredient or ingredients of group D' will still effectively prevent blackening of aluminum portions. The ingredient or ingredients of group D' will cooperate with an ingredient or ingredients of group C' in effectively inhibiting aluminum heating surface corrosion.

Still further, coolant compositions not containing conventional additives such as silicates, amine salts, borates, nitrites and molybdates according to the present invention do not produce harmful nitrosoamine, do not form gels in hard water, do not corrode aluminum or aluminum alloys, or do not oxidize coolants.

What is claimed is:

1. A low-phosphorus content, glycol-based coolant composition, containing:
   a) 0.1–5.0% by weight of at least one ingredient selected from group A' consisting of C5–C12 aliphatic dibasic acids and alkali metal salts thereof;
   b) 0.1–10% by weight of at least one ingredient selected from group B' consisting of alkyl bensoic acids and alkali metal salts thereof;
   c) 0.001–0.1% by weight of at least one ingredient selected from group C' consisting of strontium compounds and alkali metal salts thereof; and
   d) 0.1–0.3% by weight of at least one ingredient selected from group D' consisting of phosphoric acids and alkali metal salts thereof.

2. A coolant composition of claim 1, wherein essentially no silicates, amine salts, borates, nitrites or molybdates are contained therein.

3. A coolant composition of claim 1, further containing 0.05–1.0% by weight of a triazole or triazoles.

4. A coolant composition of claim 1, further containing 0.01–1.0% by weight of a thiazone or thiazoles.

* * * * *